(12) United States Patent
Haddad et al.

(10) Patent No.: US 8,750,303 B2
(45) Date of Patent: Jun. 10, 2014

(54) MOBILITY SIGNALING DELEGATION

(75) Inventors: Wassim Haddad, Bromma (SE); Suresh Krishnan, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1051 days.

(21) Appl. No.: 11/738,819

(22) Filed: Apr. 23, 2007

(65) Prior Publication Data

US 2007/0287472 A1    Dec. 13, 2007

Related U.S. Application Data

(60) Provisional application No. 60/812,621, filed on Jun. 12, 2006.

(51) Int. Cl.
| | |
|---|---|
| *H04L 12/28* | (2006.01) |
| *H04L 12/56* | (2006.01) |
| *H04L 29/06* | (2006.01) |
| *H04W 84/12* | (2009.01) |

(52) U.S. Cl.
CPC .............. *H04L 45/00* (2013.01); *H04L 29/06* (2013.01); *H04W 84/12* (2013.01)
USPC ........... 370/392; 370/401; 370/338; 370/328; 370/313

(58) Field of Classification Search
CPC . H04L 45/00; H04L 29/0653; H04L 49/3009; H04L 47/10; H04L 29/06; H04L 29/10; H04L 29/06027; H04L 12/66; H04L 12/189; H04L 12/5895; H04W 8/26; H04W 80/04; H04W 84/12; H04W 84/18; H04W 88/06
USPC .......................... 370/401, 313, 392, 328, 338
See application file for complete search history.

(56) References Cited

U.S. PATENT DOCUMENTS

| | | | |
|---|---|---|---|
| 2002/0031107 A1* | 3/2002 | Li et al. .......................... | 370/338 |
| 2003/0174691 A1* | 9/2003 | Muhonen et al. ............. | 370/351 |
| 2004/0095913 A1 | 5/2004 | Westphal | |
| 2004/0165551 A1 | 8/2004 | Krishnamurthi et al. | |
| 2005/0041634 A1 | 2/2005 | Aura | |
| 2006/0098575 A1 | 5/2006 | Lee | |
| 2006/0120315 A1 | 6/2006 | Olivereau et al. | |
| 2006/0256762 A1* | 11/2006 | Patel et al. .................... | 370/338 |
| 2008/0130572 A1* | 6/2008 | Zhang et al. .................. | 370/331 |
| 2008/0198805 A1* | 8/2008 | Weniger et al. ............... | 370/331 |
| 2009/0031130 A1* | 1/2009 | Hirano et al. ................. | 713/170 |

FOREIGN PATENT DOCUMENTS

GB          2400269 A          10/2004

OTHER PUBLICATIONS

Wassim Haddad et al., Secure Neighbor Discovery (SEND) Optimization and Adaptation for Mobility: The OptiSEND Protocol, Network Working Group, Internet Draft, Mar. 6, 2006.

* cited by examiner

*Primary Examiner* — Ajit Patel
(74) *Attorney, Agent, or Firm* — Ericsson Inc.

(57) ABSTRACT

Systems and methods are described which delegate reachability testing for mobility signaling in communication networks. A mobile node transmits a mobility signaling package to other network nodes, which can use the information contained therein to perform the delegated reachability testing.

7 Claims, 7 Drawing Sheets

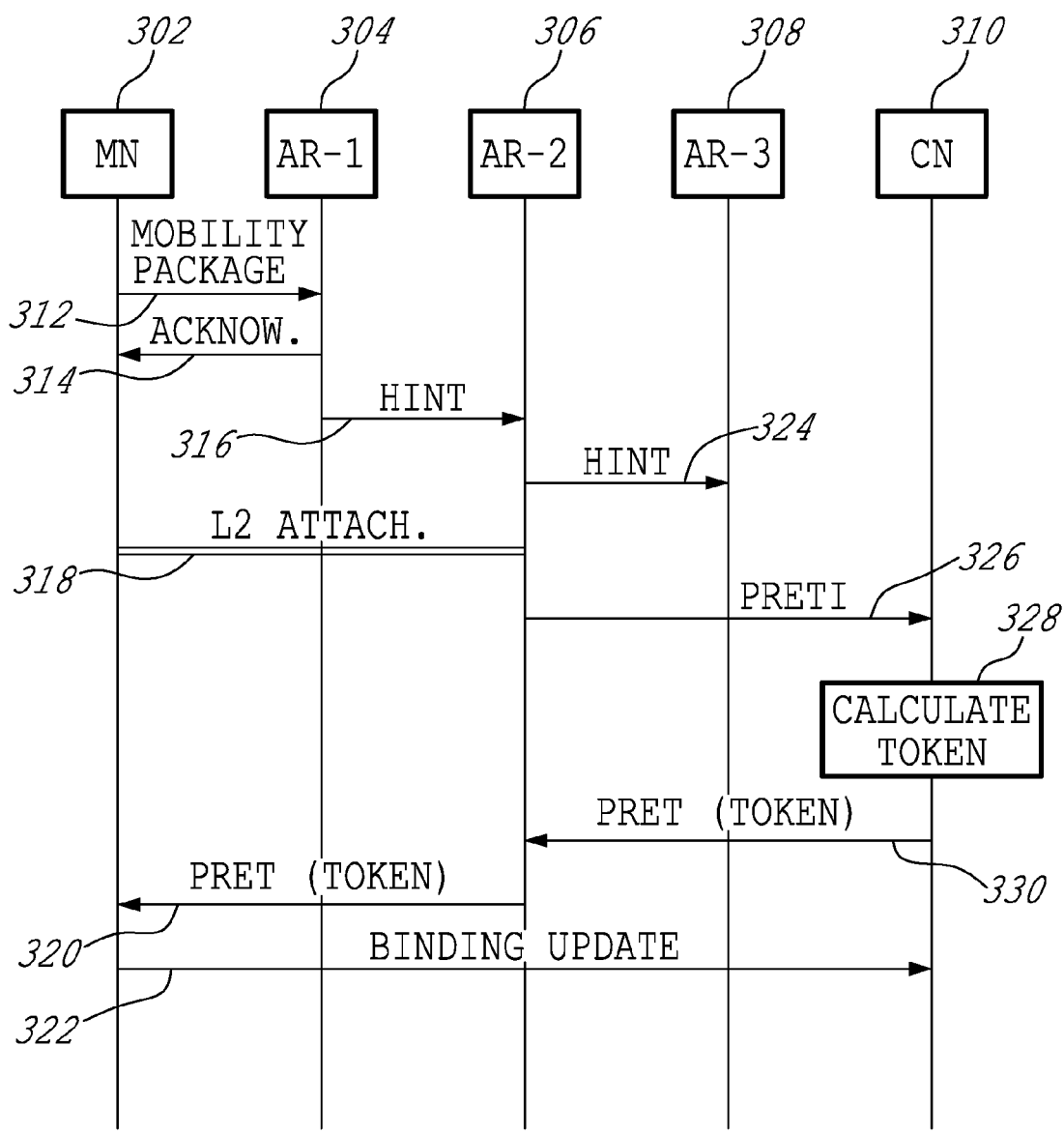

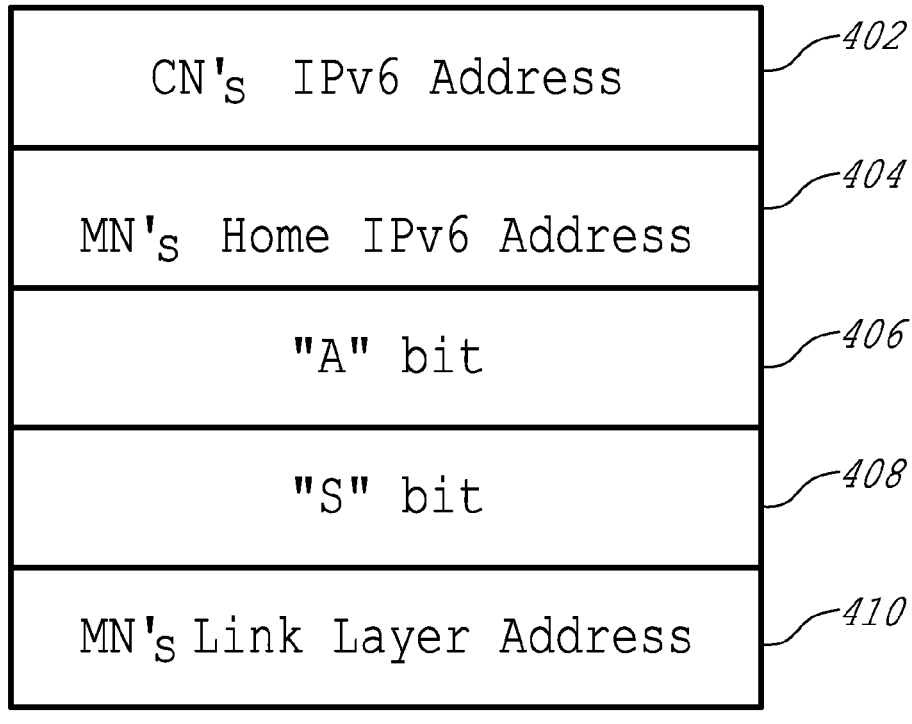
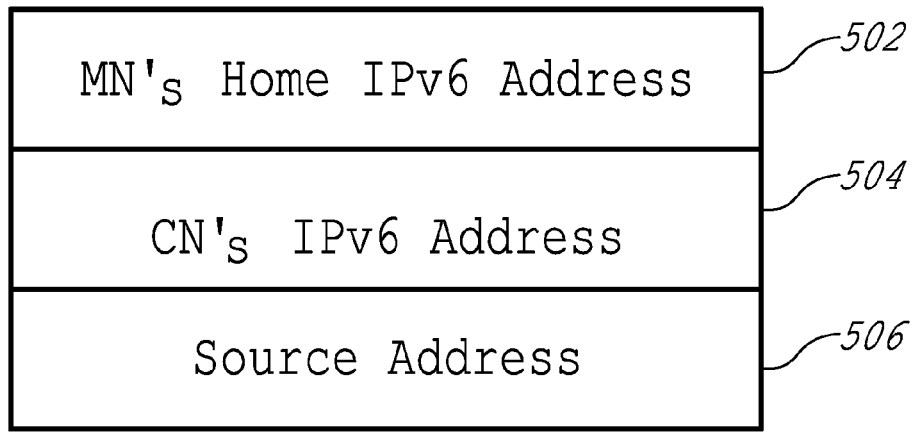

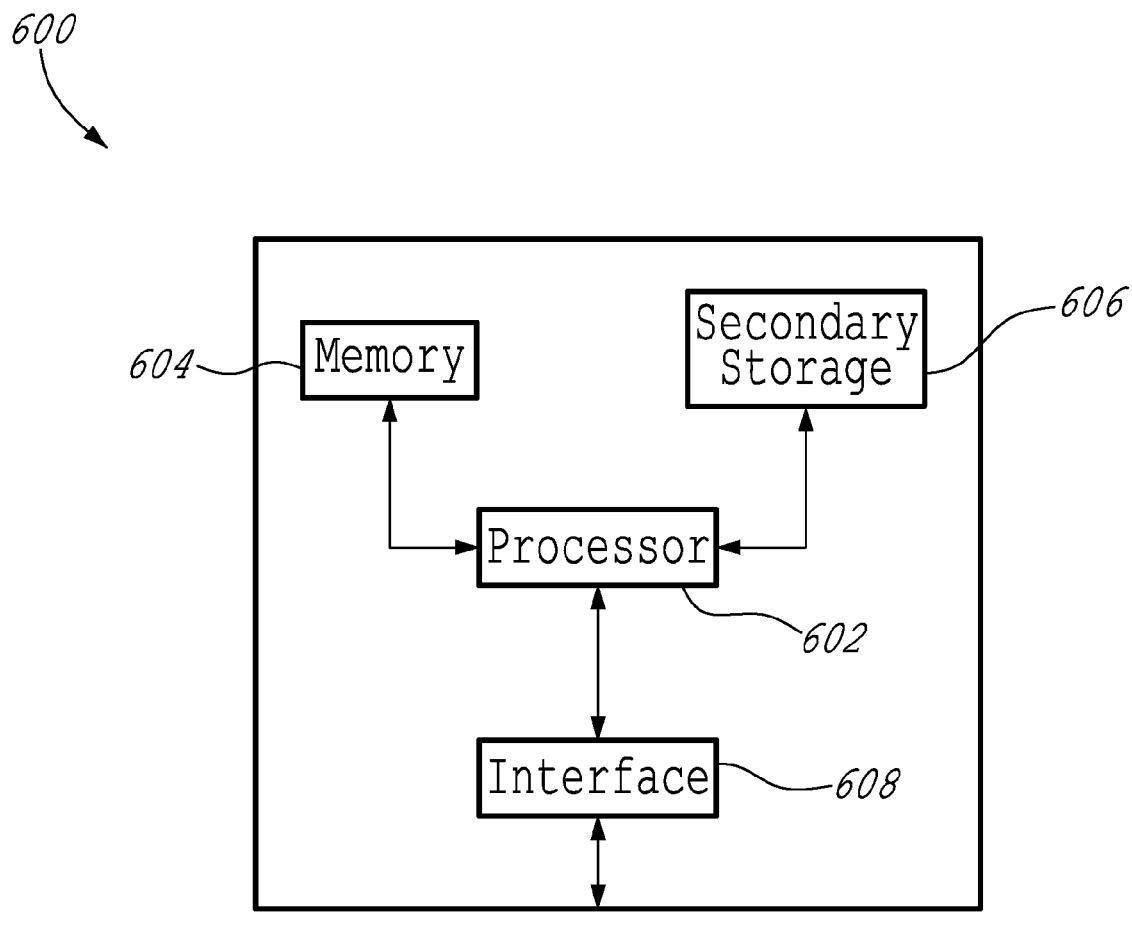

MOBILITY SIGNALING DELEGATION

RELATED APPLICATION

This application is related to, and claims priority from, U.S. Provisional Patent Application Ser. No. 60/812,621 filed on Jun. 12, 2006, entitled "Mobility Signaling Delegation in OptiSEND", the disclosure of which is incorporated here by reference.

TECHNICAL FIELD

The present invention relates generally to telecommunications systems and in particular to methods and systems for delegating signaling to facilitate mobility in communication networks.

BACKGROUND

As the consumer electronics industry continues to mature, and the capabilities of processors increase, more devices have become available for public use that allow the transfer of data between devices and more applications have become available that operate based on their transferred data. Of particular note are the Internet and local area networks (LANs). These two innovations allow multiple users and multiple devices to communicate and exchange data between different devices and device types. With the advent of these devices and capabilities, users (both business and residential) increasingly desire to transmit data from mobile locations.

The first widespread deployment of a protocol to deal with these issues, was Internet Protocol version 4 (IPv4) in the early 1980's. IPv4 is a network layer protocol used to provide unique addressing to ensure that two computers communicating over the Internet can uniquely identify each other. IPv4 has a 32-bit addressing scheme which allows for $2^{32}$ (approximately 4.2 billion) potentially unique addresses. This limit of $2^{32}$ addresses is becoming a bottleneck as the need for more unique addresses will arrive in the foreseeable future. Additionally, IPv4 was not specifically designed to be efficient for mobile users. In fact, when IPv4 was implemented there were not a lot of mobile consumer devices that could communicate across the Internet as there are today. In this context, mobile IP equipment can be considered to be any piece of equipment that is moveable, e.g., a laptop computer, cell phone or a Personal Digital Assistant (PDA), and that crosses boundaries between different networks while desiring to maintain connectivity or be allowed to connect to a foreign network. Accordingly, as this need and the need for more IP addresses developed, Internet Protocol version 6 (IPv6) was created and is now being implemented.

IPv6 uses a 128-bit addressing scheme which allows for $2^{128}$ unique addresses, i.e., significantly more addresses than are provided for in IPv4. The addressing scheme in IPv6 is composed of two parts: a 64-bit host part and a 64-bit sub network prefix (subnet prefix). IPv6 is also more mobile friendly than IPv4, particularly with the addition of Mobile IPv6 (MIPv6).

MIPv6 uses a return routablity (RR) procedure for communications between a Mobile Network (or node) (MN) and a Correspondent Node (CN). This RR procedure generates a shared secret between the MN and the CN in order to authenticate binding update (BU) messages. Return routability involves exchanging four signaling messages between the MN and the CN. These messages allow the CN to test the MN's reachability for the MN's two addresses, i.e., the MN's IPv6 home address and the MN's foreign address. A MN's foreign address is related to the access router (AR) through which the MN is attaching to a network.

One downside of the RR process is that the four messages used to perform reachability testing put a large load on the MN with respect to both latency and battery consumption, which can negatively effect both real time use during handoffs and battery life of a mobile device. In an effort to improve MIPv6, Optimized MIPv6 (OMIPv6) allows for a reduction in the required connectivity traffic between a MN and a CN. More specifically, by removing the reachability test of the home address, systems capable of using OMIPv6 do not require two of the four messages used in MIPv6. An illustration of the required reachability test messages used in OMIPv6 is shown in FIG. 1(a). The reachability test under OMIPv6 uses two messages: a Care of Test Init (CoTI) message 102 and a Care of Test (CoT) message 104. The CoTI message 102 originates from MN 106 and is forwarded by AR 108 to CN 110. Upon receipt of the CoTI message 102, CN 110 creates and transmits the CoT message 104 back to MN 106. In this purely illustrative example only one AR 108 is shown, however multiple ARs (or nodes) can exist in the communication flow path between MN 106 and CN 110.

Both the CoTI message 102 and the CoT message 104 are types of Mobility Header messages. They can be differentiated by a different value in the MN Type field of the Mobility Header message and by their respective contents in the Message Data field. For the CoTI message 102, the Message Data field contains three parts as shown in FIG. 1(b). These parts are Reserved 120, Care of Init Cookie 122 and Mobility Options 124. For the CoT message 104, the Message Data field contains four parts as shown in FIG. 1(c). These parts are Care of Nonce Index 130, Care of Init Cookie 132, Care of Keygen Token 134 and Mobility Options 136. For more information regarding Mobility Header messages the interested reader is pointed to "RFC 3775—Mobility Support in IPv6" dated June 2004, the disclosure of which is incorporated here by reference.

This above described reduction in message quantity for mobility signaling in OMIPv6 as compared to earlier IP versions further improves the system, however more improvements can be made to mobility signaling which further reduce latency and increase battery life. Accordingly exemplary embodiments described below address the need for improving the efficiency of moving through different mobile networks with mobile equipment in order to, for example, reduce latency and extend battery life.

SUMMARY

According to one exemplary embodiment of the invention a method of exchanging mobility signaling in a session between a mobile node and a correspondent node including the steps of sending from said mobile node, to a first access router: a home address of the mobile node; a Layer two address of the mobile node; and an address of the correspondent node; sending from the first access router, to a second access router: the home address of the mobile node; the Layer two address of the mobile node; and the address of the correspondent node; detecting at the second access router a Layer two attachment of the mobile node; sending from the second access router to the correspondent node a test init message including the home address of the mobile node; calculating at the correspondent node a token for the mobile node; sending from the correspondent node, to the second access router a test init response message comprising the token; and sending from the second access router to the mobile node the token.

According to another exemplary embodiment of the invention a mobile node includes a processor in communications with a memory unit; wherein the processor transmits a first message to a network node which connects the mobile node to a network, the first message containing information usable to perform a reachability test, the information including the mobile node's home address; and the correspondent node's address.

According to yet another exemplary embodiment of the invention a network node for receiving a first message from a mobile node includes a processor in communications with a memory unit; wherein the processor receives the first message from the mobile node, the first message including the mobile node's home address and a correspondent node's address, and transmits a second message containing the contents of the first message to a plurality of network nodes.

According to yet another exemplary embodiment of the invention a correspondent node for receiving messages includes a processor in communications with a memory unit; wherein the processor, upon receiving a first message from a network node including a mobile node's home address and a source address calculates a token and sends a second message to a network node related to the source address contained in the first message, the second message includes the token; and the mobile node's home address.

According to yet another exemplary embodiment a method for mobility signaling in a network includes receiving, by a network node, a first message from a mobile node, the first message including the mobile node's home address and a correspondent node's address, transmitting a second message containing contents of the first message to a plurality of other network nodes, receiving, by one of the plurality of other network nodes, the second message, and transmitting a third message to a correspondent node, the third message comprising: the mobile node's home address, the correspondent node's address, and a source address.

BRIEF DESCRIPTION OF THE DRAWINGS

The accompanying drawings illustrate exemplary embodiments, wherein:

FIG. 3 illustrates communication paths and a sequence for communications according to an exemplary embodiment;

FIG. 4 shows the contents of the message data section of a router mobility solicitation (RtMobSol) message according to exemplary embodiments;

FIG. 5 shows the contents of the message data section of a Prefix Test Init (PreTI) message according to exemplary embodiments;

FIG. 6 depicts a network node according to exemplary embodiments.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1A:
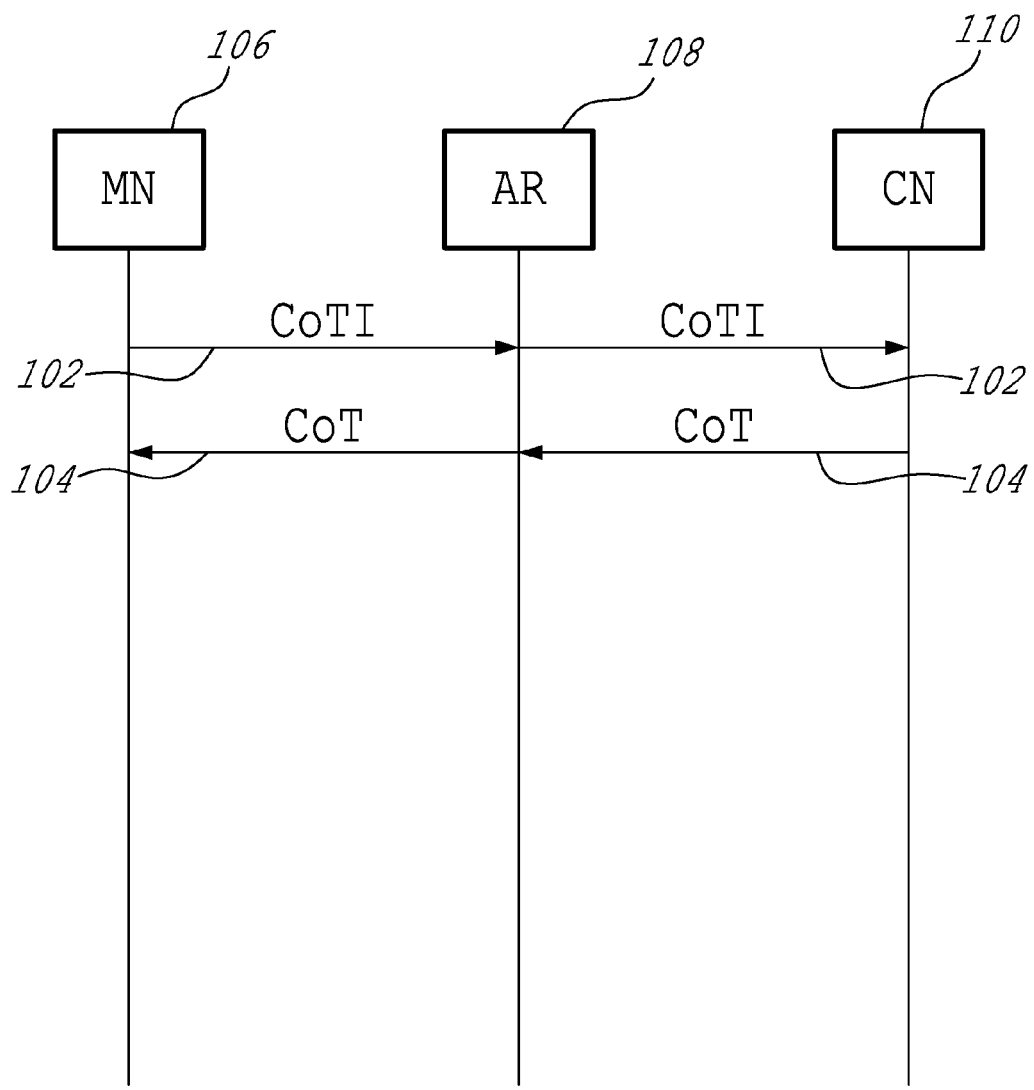
FIG. 1(a) depicts the message traffic flow for a return routability procedure under OMIPv6.
Figure 1B:
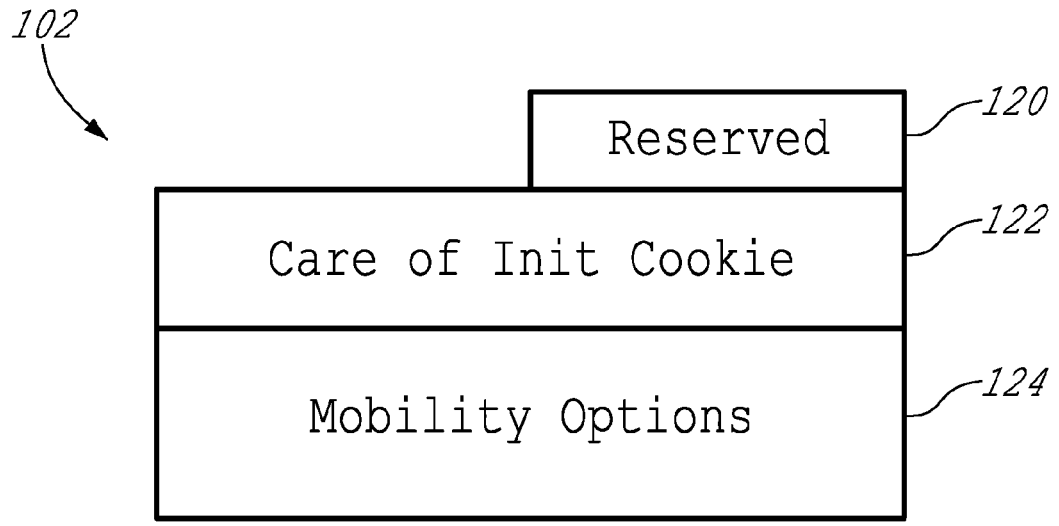
FIG. 1(b) shows the contents of the message data section of a Care of Test Init message.
Figure 1C:
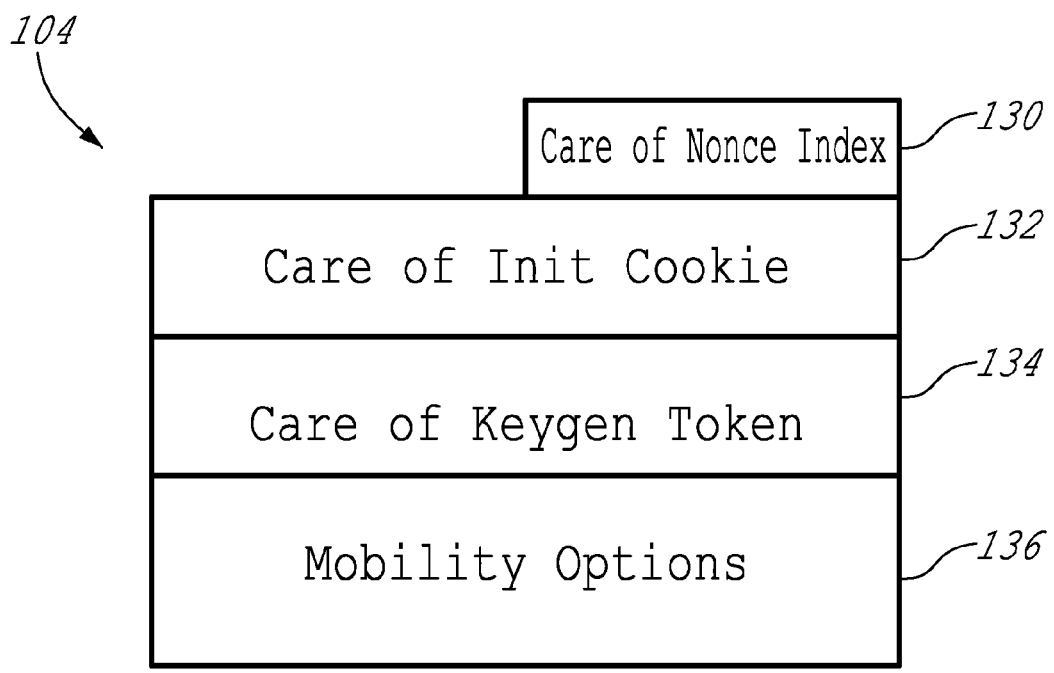
FIG. 1(c) shows the contents of the message data section of a Care of Test message.
Figure 2A:
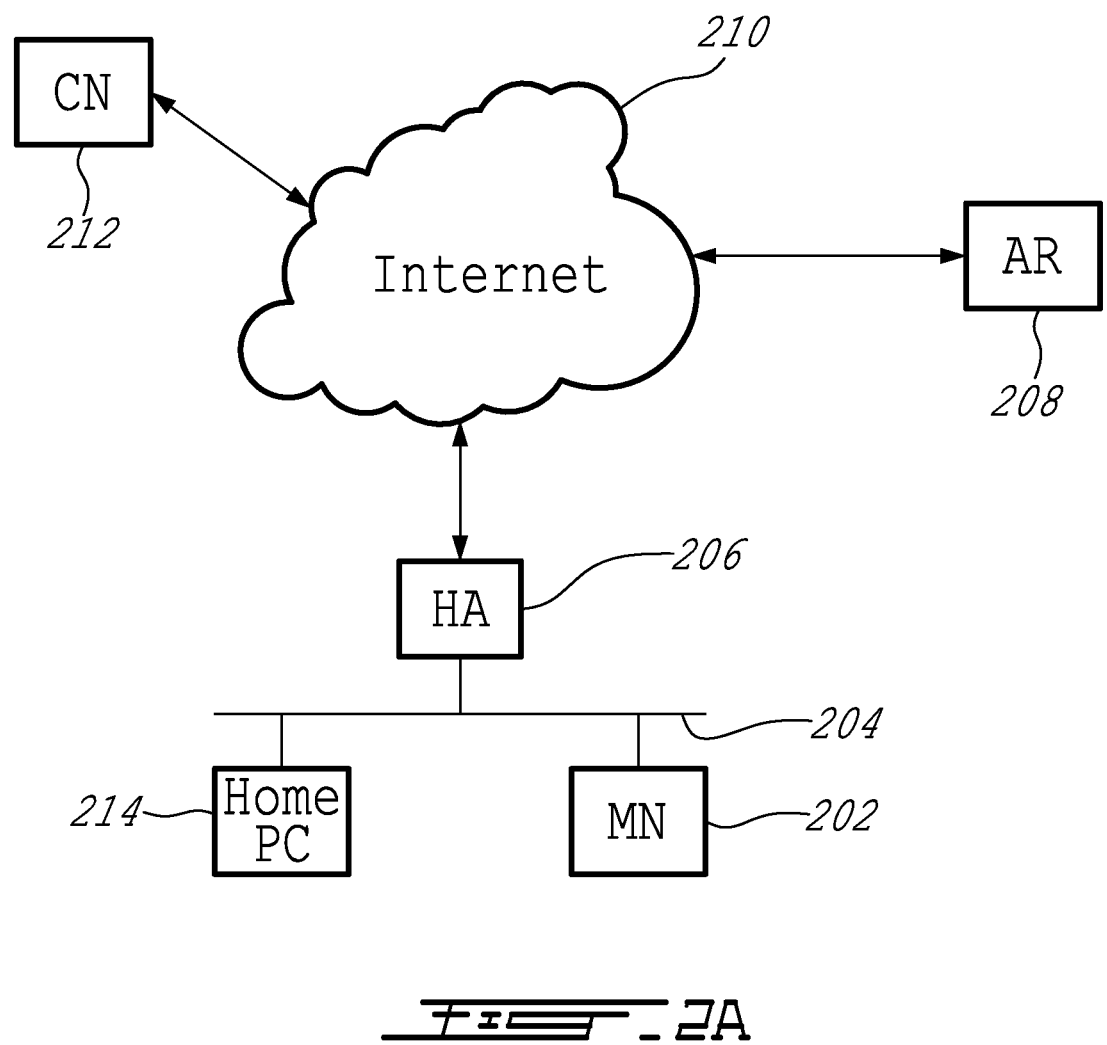
FIG. 2(a) depicts a mobile node (MN) communicating with a correspondent node (CN) through a home agent.
Figure 2B:
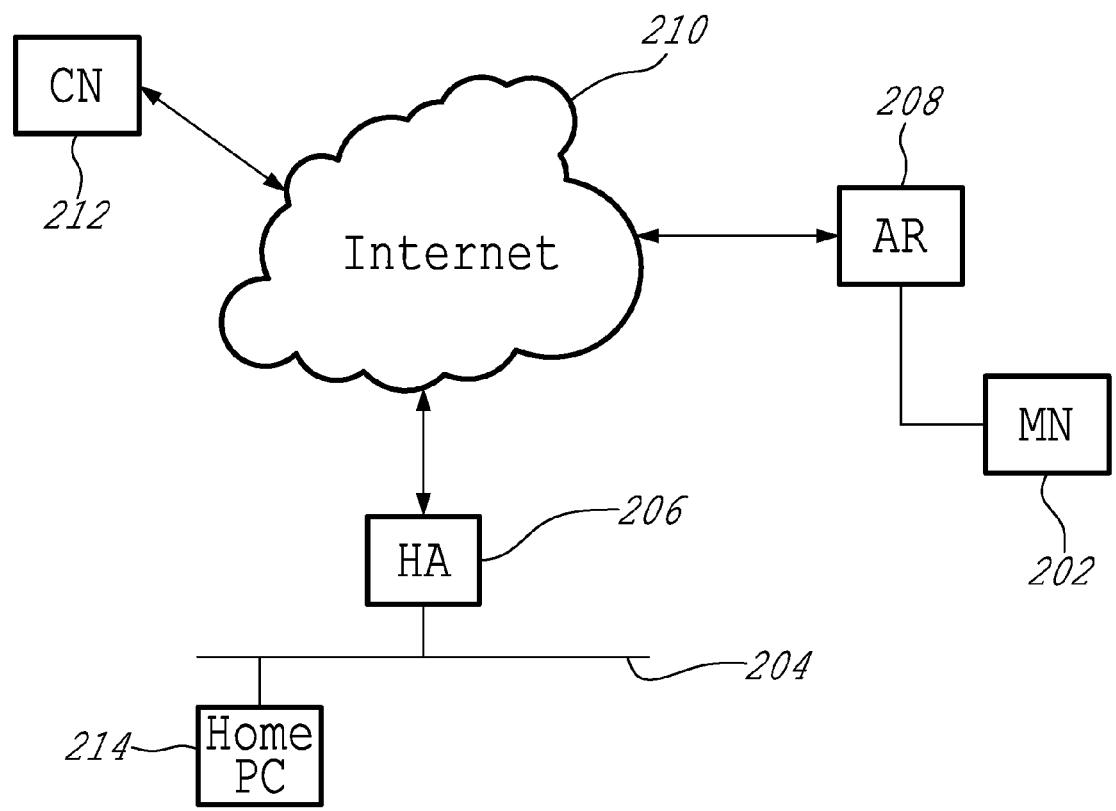
FIG. 2(b) depicts a mobile node (MN) communicating with a correspondent node (CN) through an access router (AR)

In order to provide some context for this discussion, a brief discussion of exemplary components used by a mobile network (MN) for communications will now be described according to FIGS. 2(a) and 2(b). FIG. 2(a) depicts an initial communication setup for a MN 202 that is currently attached to its home network 204. The home network 204 contains MN 202 and a home personal computer (PC) 214. MN 202 is in communication with correspondent node (CN) 212. Communications for MN 202 flow through its home agent 206 (typically a router) then to the Internet 210 and ending at CN 212. Additionally, an access router (AR) 208 is also shown to be connected to the Internet. It is to be understood that there typically would be a plurality of routers (not shown) within Internet 210 through which communications between MN 202 and CN 212 flow. In FIG. 2(b) MN 202 has left its home network 204 and is now communicating to CN 212 through AR 208 and the Internet 210.

According to exemplary embodiments the task of performing the care of address (CoA) reachability test(s) is delegated by the MN to parts of the network infrastructure, such as access routers. This delegation eliminates residual latency due to the CoA reachability test for the MN, ensures that the messages exchanged are authenticated, and optimizes the battery power consumption of the device associated with the MN. This exemplary protocol achieves this goal by using the MN's 64-bit subnet prefix for testing the reachability of the new CoA. Exemplary embodiments will now be described with respect to FIGS. 3-5.

FIG. 3 depicts communication paths and signaling according to exemplary embodiments of the present invention. Initially, a MN 302 enters the communication area of a new AR (AR-1 304 in this example) and transmits a mobility package 312 to the new AR-1 304. The mobility package 312 can be sent as an Internet Control Message Protocol version 6 (ICMPv6) message, e.g., using a format similar to that of the unicast RtAdv message. The mobility package 312 contains a router mobility solicitation (RtMobSol) message, as shown in FIG. 4, which contains, for example, the CN's IPv6 address 402 and the MN's IPv6 home address 404. The MN's IPv6 home address 404 is the address of the MN 302 when the MN 302 is part of its home network. Additionally, the MN's Layer 2 (link layer) address 410 and an optional "A" bit 406 and/or an "S" bit 408 can be contained in the RtMobSol message.

The RtMobSol message can be authenticated using, for example, the shared key obtained via the OptiSEND protocol. The OptiSEND protocol is described in more detail below. AR-1 304 receives the mobility package 312 from MN 302 and replies via a unicast message with an authenticated acknowledgement 314 to MN 302. This authenticated acknowledgement 314 can be transmitted as a router mobility acknowledgement (RtMobAck) message which contains, for example, OptiSEND related parameters such as the value at the tip of the One Way Hash Chain, the shared secret, etc.

Additionally AR-1 304 forwards the contents of the RtMobSol message, shown as hint 316 in FIG. 3, to neighboring ARs, which in this exemplary embodiment is AR-2 306. Upon receipt of the hint 316 by AR-2 306, the contents of the RtMobSol message can be stored along with the data obtained from running the OptiSEND protocol on the access routers. AR-2 306 forwards a hint 324, which contains the contents of the RtMobSol message, to its neighboring ARs, in this case, AR-3 308. This forwarding can continue as long as the MN 302 is moving within the same domain. When AR-2 306 detects a Layer two attachment from MN 302, AR-2 306 performs a CoA reachability test with CN 310. This CoA reachability test can be delegated to, and performed by, AR-2 306 because the forwarded contents of the RtMobSol message contain the information needed to perform the CoA reachability test, such as the CN's IPv6 addresses 402 and the MN's IPv6 home address 404. Note that in addition to, or as an alternative to, hint forwarding as described above, ARs can also use hints received via the link layer. The delegated CoA reachability test according to an exemplary embodiment will now be described.

The CoA reachability test is initiated by AR-2 306. Initially, AR-2 306 sends a Prefix Test nit (PreTI) message 326 to CN 310. As shown in FIG. 5, the PreTI message 326 contains the MN's home IPv6 address 502, the CN's IPv6 address 504 and a source address 506. The source address 506 contains a subnet prefix which is advertised to the MN 302, in this example, the subnet prefix of AR-2 306. The PreTI message 326 contains the MN's home IPv6 address 502 to allow CN 310 to fetch the corresponding key mobility signaling key (Kms) from its correspondent binding cache entry (BCE) in order to validate the PreTI message 326.

Returning to FIG. 3, CN 310 receives a valid PreTI message 326 from AR-2 306. CN 310 computes a prefix keygen token from the 64-bit prefix used in the IPv6 source address and the long lifetime shared secret between the MN 302 and CN 310, e.g., the key binding mechanism (Kbmperm) generated from using the OMIPv6 protocol. According to some exemplary embodiments, the prekey token calculation 328 is computed by CN 310 using the following equation:

$$\text{Prekey Token} = \text{First}(64, SHA1(SA\_Prefix|nonce|SHA1(Kbmperm))) \quad (1)$$

where SA_Prefix is the 64-bit prefix carried by the IPv6 source address sent in the PreTI message 326 and Kbmperm is the long lifetime shared secret generated by the CN 310 when running under OMIPv6 protocol. Alternatively, other methods for prekey token calculation 328 could be used.

After token calculation step 328, the CN 310 generates a prefix test (PreT) message 330. This PreT message 330 is an acknowledgement message which is sent back to the same IPv6 source address that was carried in the PreTI message 326, which in this example is the source address of AR-2 306. Again it should be noted that the specific address used as the source address is not important as long as an appropriate subnet prefix is used. Additionally, the PreT message 330 contains the MN's 302 home address and is authenticated with the Kms. AR-2 306 then receives PreT message 330 from CN 310.

Upon completion of the CoA reachability test, AR-2 304 sends an acknowledgement message to MN 302. MN 304 then transmits a binding update (BU) message to CN 310. CN 310 receives the BU message from MN 302. This then allows follow on communications to occur and be transmitted via normal MIPv6 protocols for MN 302 and CN 310.

Subsequent reachability test messages will also be sent by the MN's current AR on behalf of the MN. Additionally, as a MN continues to roam, this procedure can be used when a MN enters a region where a MN needs to use a new AR. To assist in this process, when a MN establishes a session with new CN, it can send a RtMobSol message to its current AR that sets a new bit. Two exemplary bit options, as shown in FIG. 4, are an "A" or add bit 406 and "S" or suppress bit 408. The "A" bit 406, e.g., if set to "1", can request the AR to forward the new CN's IPv6 address to potential new AR(s). The "S" bit 408, e.g., if set to "1", can be used to request the AR(s) to remove an existing CN's IPv6 address from its list. Additionally, other bit options can be created and used as desired in a RtMobSol message.

Security is useful for the communications used when a MN attaches to a new AR and the CoA test is performed with a CN. Without appropriate security measures, malicious nodes can attempt to enter a network and imitate the MN with respect to ARs and CNs. According to exemplary embodiments, and as briefly mentioned above, the MN shares some aspects of security with the ARs. More specifically, a shared secret is created that the MN, ARs and CN share. Thus, when a malicious node enters a network imitating a valid MN and attempts to correspond with an AR, the malicious node will be denied access due its lacking a shared secret with the AR.

Secure Neighbor Protocol Discovery (SEND) was designed to mitigate potential threats against the IPv6 Neighbor Discovery Protocol (NDP). SEND is based upon a Cryptographically Generated Address (CGA) and relies upon using a RSA signature. RSA is an algorithm typically used in public key encryption. An improvement upon SEND is Optimized SEND (OptiSEND) which reduces the processing requirements for mobile devices while still maintaining security and efficiency. OptiSEND provides that the ARs rely on one-way hash chains and shared secretes to authenticate messages, such as, router advertisement messages. OptiSEND also provides that outside nodes (ONs) authenticate a special set of messages by using a shared secret obtained from using CGA technology when exchanging a particular message with an AR. Additionally, OptiSEND provides that ON auto-configures additional IPv6 addresses (as needed) by using the shared secret and other parameters to compute new interface identifiers.

In the above exemplary embodiment, the CoA reachability test, or prefix reachability test, was authenticated. This authentication is desirable for some exemplary embodiments, but not always required. In order to perform the authentication, the hash of the symmetric key generated from running the OptiSEND protocol can be used. This key, Kms, is preferably sent from the MN to each CN in the first binding update (BU) message. Additionally, the Kms is preferably sent in an encrypted form to each CN. In order to do this, the MN will typically use the Kbm generated during the first (and typically only unless the shared secret life has expired) return routability test performed in OMIPv6 to encrypt the kms. The Kms will be carried in a new option called signaling delegation (SID). The SID will reach a CN upon receiving a BU containing a SID option from a MN. A CN will then, preferably, decrypt the Kms and store the decrypted Kms in the MN's corresponding binding cache entry (BCE).

The exemplary embodiments described above provide for messages and protocols involving access routers and other network nodes. An exemplary network node 600 will now be described with respect to FIG. 6. Network node 600 can contain a processor 602 (or multiple processor cores), memory 604, one or more secondary storage devices 606 and an interface unit 608 to facilitate communications between network node 600 and the rest of the network. The memory can be used for storage of exemplary items described above such as the contents of a RtMobSol message, BCE, decrypted Kms or any other desirable information such as address lookup tables. Thus, a network node according to an exemplary embodiment may include a processor for transmitting and receiving messages associated with at least one of CoA information related to a mobile network and/or a correspondent node.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method of exchanging mobility signaling in a session between a mobile node and a correspondent node, when the mobile node enters a communication area of a new access router and a neighboring access router, the method comprising the steps of:
   receiving at the neighboring access router, from the new access router:
   a home address of said mobile node;
   a Layer two address of said mobile node; and
   an address of said correspondent node;
   detecting, at the neighboring access router, a Layer two attachment of said mobile node to the neighboring access router; and
   upon detection of the Layer two attachment, initiating, by the neighboring access router, a reachability test with the correspondent node on behalf of the mobile node, said reachability test comprising:
   said neighboring access router sending a test init message to said correspondent node, wherein said correspondent node calculates a specific token;
   receiving from said correspondent node a test init response message comprising said specific token; and
   forwarding said specific token to said mobile node;
   wherein the neighboring access router is not the home agent of the mobile node.

2. The method of claim 1, further comprising: acquiring for said mobile node a second care of address from said neighboring access route.

3. The method of claim 1, wherein the test init message comprises said home address of said mobile node.

4. A mobile node comprising:
   a processor in communications with a memory unit;
   wherein said processor is configured to transmit a first message to a new access router and a plurality of neighboring access routers when the mobile node enters a communication area of the new access router, said first message containing information usable to perform a reachability test by any of the plurality of neighboring access routers, on behalf of the mobile node, said information including:
   said mobile node's home address;
   said correspondent node's address; and
   at least one of a bit for suppressing an address of a correspondent node and a bit for requesting the forwarding of a correspondent node's IP address to neighboring access routers;
   wherein said first message is authenticated via a shared secret obtained from an Optimized Secure Neighbor Discovery (OptiSEND) protocol and wherein none of the plurality of neighboring access routers is the home agent of the mobile node.

5. An access router for receiving a message from another access router for exchanging mobility signaling in a session between a mobile node and a correspondent node, the access node comprising:
   a processor in communications with a memory unit;
   wherein said processor is configured to receive said message including said mobile node's home address and said correspondent node's address and containing information usable to perform, by the access router, a reachability test with the correspondent node, on behalf of the mobile and wherein the access router and the other access router are not the home agent of the mobile node; and
   wherein said processor is configured to perform said reachability test, which test comprises: sending a test init message to the correspondent node by which the correspondent node can calculate a specific token, receiving a test init response message from the correspondent node comprising said specific token; and forwarding said specific token to said mobile node, upon detection of a Layer two attachment of the mobile node to the access router.

6. The access router of claim 5, wherein the processor is further configured to transmit a further message to the correspondent node, said further message comprising:
   said mobile node's home address;
   said correspondent node's address; and
   a source address.

7. The method of claim 3, wherein the mobile node uses said token to authenticate messages exchanged between said mobile node and said correspondent node.

* * * * *